US012596412B2

(12) United States Patent
Radhakrishnan et al.

(10) Patent No.: US 12,596,412 B2
(45) Date of Patent: Apr. 7, 2026

(54) DYNAMIC EXHAUST PORT MECHANISMS FOR COMPUTER SYSTEMS

(71) Applicant: Intel Corporation, Santa Clara, CA (US)

(72) Inventors: Arunpandi Radhakrishnan, Bangalore (IN); Bijendra Singh, Bangalore (IN); Samarth Alva, Bangalore (IN); Raghavendra S. Kanivihalli, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 17/119,253

(22) Filed: Dec. 11, 2020

(65) Prior Publication Data

US 2021/0096618 A1 Apr. 1, 2021

(51) Int. Cl.
*G06F 1/20* (2006.01)
*G06F 1/16* (2006.01)

(52) U.S. Cl.
CPC ............ *G06F 1/203* (2013.01); *G06F 1/1616* (2013.01); *G06F 1/1677* (2013.01); *G06F 1/1681* (2013.01)

(58) Field of Classification Search
CPC ....... G06F 1/203; G06F 1/1681; G06F 1/1677
See application file for complete search history.

(56) References Cited

U.S. PATENT DOCUMENTS

| | | | | |
|---|---|---|---|---|
| 6,008,986 A | * | 12/1999 | Mok ..................... | G06F 1/1667 |
| | | | | 361/679.54 |
| 6,816,371 B2 | * | 11/2004 | Agata ..................... | G06F 1/203 |
| | | | | 361/679.48 |
| 6,909,602 B2 | * | 6/2005 | Dietrich .................. | G06F 1/203 |
| | | | | 361/679.48 |
| 8,937,806 B2 | * | 1/2015 | Senatori .................. | G06F 1/203 |
| | | | | 361/694 |
| 8,976,524 B2 | * | 3/2015 | Wang ..................... | G06F 1/1656 |
| | | | | 361/679.48 |
| 9,030,820 B2 | * | 5/2015 | Guo ...................... | G06F 1/1637 |
| | | | | 361/679.59 |
| 10,551,881 B2 | * | 2/2020 | Ho ........................ | G06F 1/1681 |

(Continued)

FOREIGN PATENT DOCUMENTS

| | | |
|---|---|---|
| CN | 206946411 | 1/2018 |
| CN | 207742605 | 8/2018 |

(Continued)

OTHER PUBLICATIONS

PCT, International Search Report and Written Opinion issued in PCT/US2021/051110, dated Dec. 28, 2021; 13 pages.

(Continued)

*Primary Examiner* — Nidhi Thaker
(74) *Attorney, Agent, or Firm* — Alliance IP, LLC

(57) ABSTRACT

In one embodiment, a computer system (e.g., a notebook computer) includes a lid with a display and a base coupled to the lid at one end of the base. The base defines one or more openings proximate to the end at which the lid is coupled to the base, and the computer system further includes a solid panel positioned proximate to the openings in the base such that the panel partially blocks the openings of the base. The position of the solid panel with respect to the openings of the base is based on a position of the lid with respect to the base.

5 Claims, 16 Drawing Sheets

(56) References Cited

U.S. PATENT DOCUMENTS

| | | | | |
|---|---|---|---|---|
| 10,627,874 | B2 * | 4/2020 | Lin | G06F 1/1616 |
| 11,314,297 | B1 * | 4/2022 | Degner | G06F 1/206 |
| 11,460,897 | B2 * | 10/2022 | Kulkarni | H05K 7/20972 |
| 11,690,198 | B2 * | 6/2023 | Lai | G06F 1/206 361/679.26 |
| 11,989,067 | B2 * | 5/2024 | Kulkarni | H05K 7/20972 |
| 12,029,006 | B2 * | 7/2024 | Williams | G06F 1/203 |
| 2006/0104022 | A1 * | 5/2006 | Wilcox | G06F 1/203 361/679.48 |
| 2008/0019093 | A1 * | 1/2008 | Hongo | G06F 1/203 361/693 |
| 2013/0027873 | A1 * | 1/2013 | Chen | G06F 1/203 361/695 |
| 2014/0092544 | A1 * | 4/2014 | Nishi | G06F 1/1616 361/679.09 |
| 2017/0153677 | A1 * | 6/2017 | Cheng | G06F 1/1637 |
| 2018/0284858 | A1 * | 10/2018 | Lee | G06F 1/1618 |
| 2019/0200484 | A1 * | 6/2019 | Chen | H05K 7/20009 |
| 2019/0250674 | A1 * | 8/2019 | Lin | G06F 1/1616 |
| 2020/0187381 | A1 * | 6/2020 | Degner | G06F 1/203 |
| 2020/0201405 | A1 * | 6/2020 | Yoo | H05K 7/20136 |
| 2021/0089082 | A1 * | 3/2021 | Lee | F16K 1/00 |
| 2021/0096618 | A1 | 4/2021 | Radhakrishnan et al. | |

FOREIGN PATENT DOCUMENTS

| | | |
|---|---|---|
| CN | 207867423 | 9/2018 |
| JP | 2000259287 A | 9/2000 |
| TW | M568990 | 10/2018 |
| WO | 2020123234 A1 | 6/2020 |

OTHER PUBLICATIONS

Taiwan Office Action received in Application No. 110134417, dated Apr. 28, 2025, with Statement of Relevance, 14 pages.

* cited by examiner

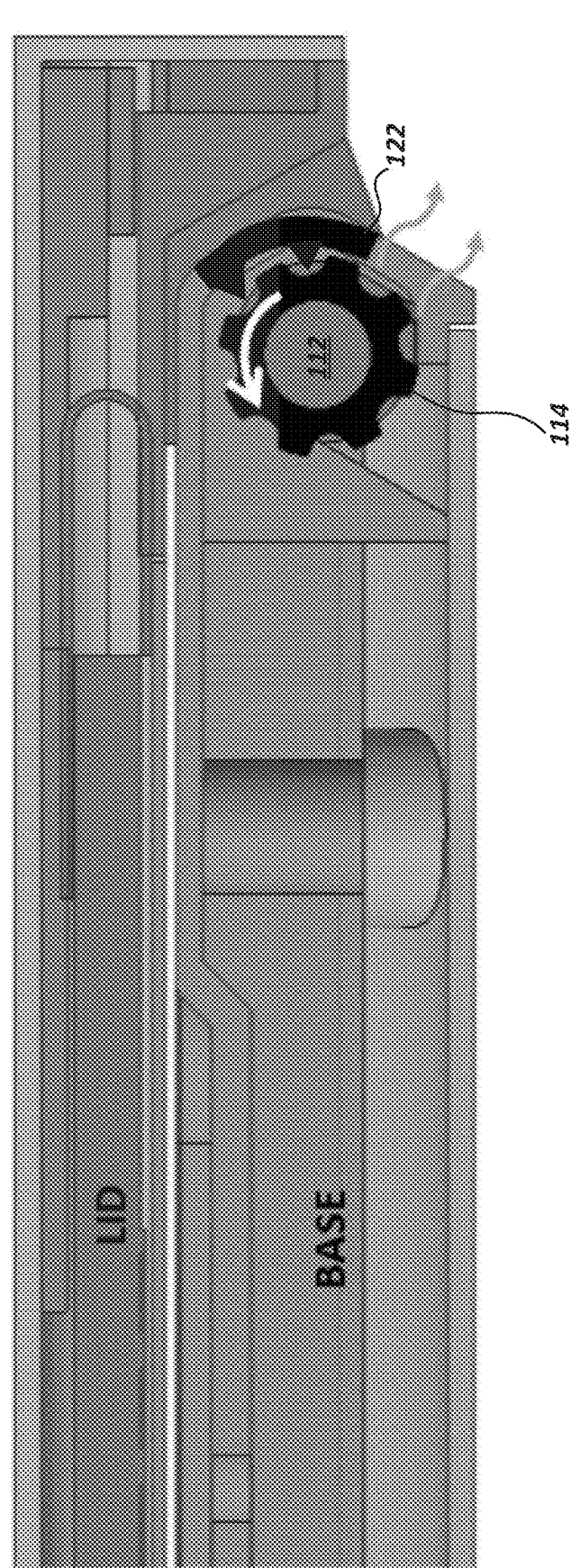
FIG. 1B

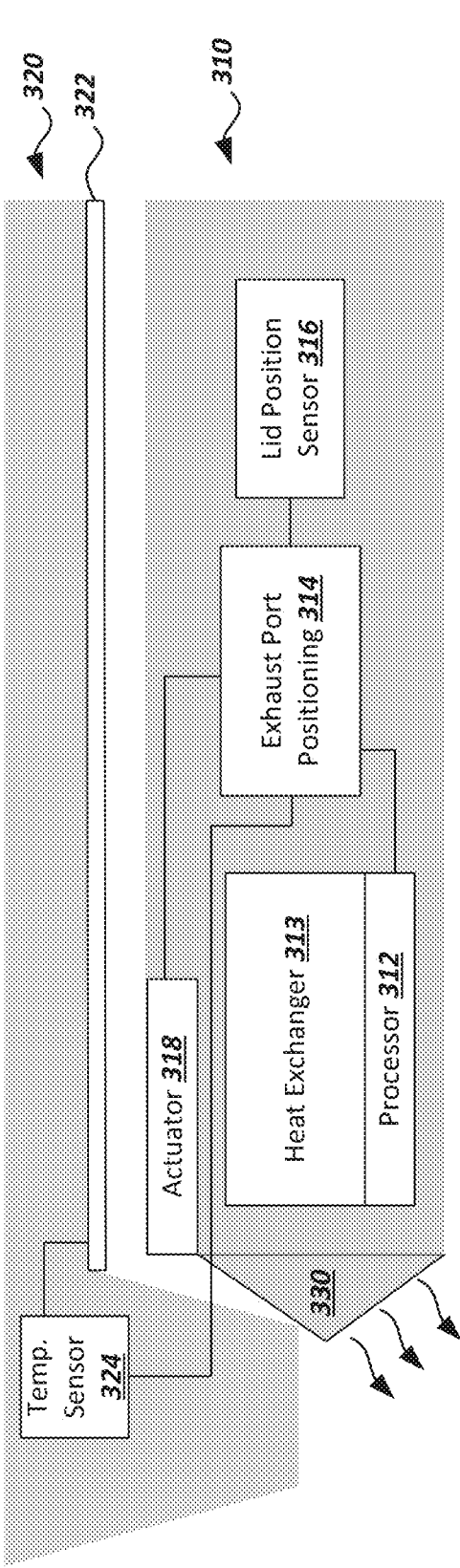
300
320
322
310
Lid Position Sensor 316
Exhaust Port Positioning 314
Actuator 318
Heat Exchanger 313
Processor 312
Temp. Sensor 324
330
FIG. 3C

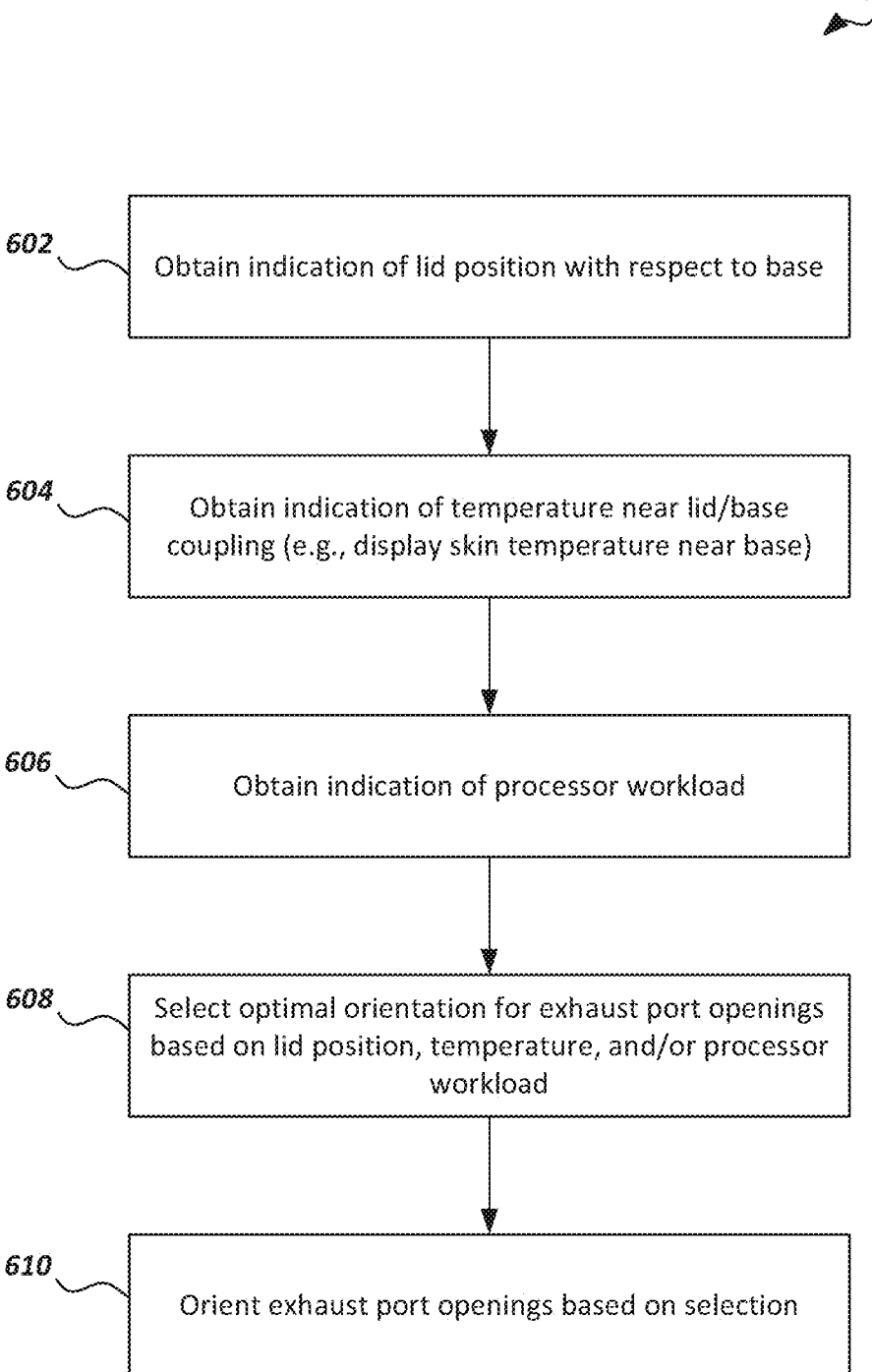

*600*

602 — Obtain indication of lid position with respect to base

604 — Obtain indication of temperature near lid/base coupling (e.g., display skin temperature near base)

606 — Obtain indication of processor workload

608 — Select optimal orientation for exhaust port openings based on lid position, temperature, and/or processor workload 610 — Orient exhaust port openings based on selection

FIG. 6

DYNAMIC EXHAUST PORT MECHANISMS FOR COMPUTER SYSTEMS

TECHNICAL FIELD

This disclosure relates in general to the field of computer systems and, more particularly, to an exhaust mechanism for computer systems such as notebook computers.

BACKGROUND

Modern notebook computer designs seek to have higher screen-to-body ratios (SBR) to provide aesthetic sleekness as well as an immersive display to users. Improving the SBR, however, may require lowering the lid position with respect to the base portion of the notebook computer, and thus, portions of the display can end up blocking a hot air exhaust port of the notebook computer. This can have a direct impact on display temperatures, which may in turn cause one or more issues, such as reliability issues or yellow mura issues with the display, or system performance issues due to reduced airflow out of the notebook computer.

BRIEF DESCRIPTION OF THE DRAWINGS

FIGS. 1A-1D illustrate an example notebook computer system with a dynamic exhaust port mechanism.

FIGS. 3A-3C illustrate simplified diagrams of an example dynamic exhaust port mechanism implementation in a notebook computer.

FIG. 6 is a flow diagram of another example process that may be implemented in a dynamic exhaust port mechanism of the present disclosure.

Like reference numbers and designations in the various drawings indicate like elements.

DETAILED DESCRIPTION OF EXAMPLE EMBODIMENTS

Figure 1A:
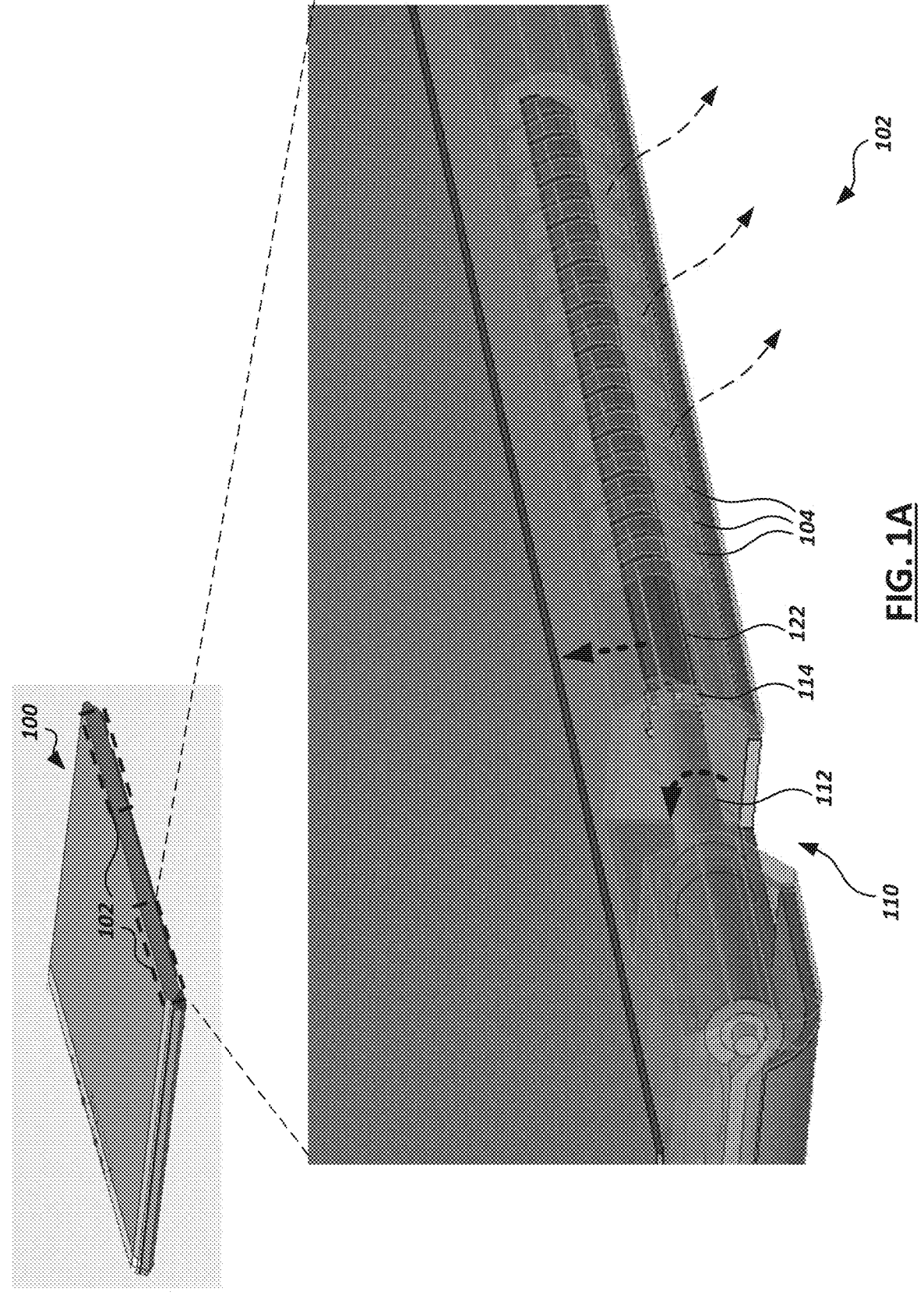

In the following description, numerous specific details are set forth, such as examples of specific configurations, structures, architectural details, etc. in order to provide a thorough understanding of the present disclosure. It will be apparent, however, to one skilled in the art that these specific details need not be employed to practice embodiments of the present disclosure. In some instances, well known components or methods may be utilized, and such details haven't been described in detail in order to avoid unnecessarily obscuring embodiments of the present disclosure.

Modern notebook computer designs seek to have higher screen-to-body ratios (SBR) to provide aesthetic sleekness as well as an immersive display to users. Improving the SBR, however, may require lowering the lid position with respect to the base portion of the notebook computer, and thus, portions of the display can end up blocking a hot air exhaust port of the notebook computer. This can have a direct impact on display temperatures, which may in turn cause one or more issues, such as reliability issues or yellow mura issues with the display, or system performance issues due to reduced airflow out of the notebook computer.

Previous solutions to this problem have included system designs with side exhaust outlets avoid direct hot air impingement on the display, and designs that have cutout features to allow for exhaust flow in the exhaust overlap region of the lid. However, these solutions have had a number of disadvantages. For example, side exhaust designs risk causing user discomfort/injury due to hot exhaust air blowing towards the hand resting position. As another example, lid cutouts lead to industrial design trade-offs, and may require display customization (which may be big cost adder) to have higher SBR.

Accordingly, embodiments of the present disclosure implement hot exhaust airflow path optimizations, such as embodiments that involve different exhaust grille opening schemes for the typical use cases, e.g., when the notebook computer lid is open (in a typical "notebook mode" use case) and when the notebook computer lid is closed (e.g., when an external display is used instead of the notebook's built-in display). Adverse implications of hot air impingement on built-in display can further be controlled, in some embodiments, by modifying the exhaust grille angle and/or opening area.

Certain embodiments may involve a mechanical system that adjust exhaust port openings in the base of a notebook computer. For example, some embodiments may involve a rack and pinion-type gear system that adjusts the orientation of exhaust port outlets, e.g., open and close the lower half of an exhaust grille based on the lid position. Other embodiments may adjust the exhaust port outlet using circuitry (e.g., an actuator) and/or logic based on the lid position. Further, certain embodiments may employ a smart temperature-based and/or workload-based exhaust port outlet angle and open area adjustment mechanism, allowing improved performance due to reduced skin temperatures and higher flow rates.

Embodiments of the present disclosure may provide one or more advantages over existing designs. For example, an exhaust port mechanism according to the present disclosure may enable immersive display experiences without compromising user experience in sleek (e.g., thin), high performance notebook designs. As another example, certain embodiments may allow for an increase in screen to body ratio (SBR) over current designs, such as SBRs between 80% to 90%. Further, in some embodiments, by preventing hot exhaust air recirculation, the C- and D-covers may be cooler by approximately 5° C., improving overall system performance by ~14% (5 W).

Figure 1C:
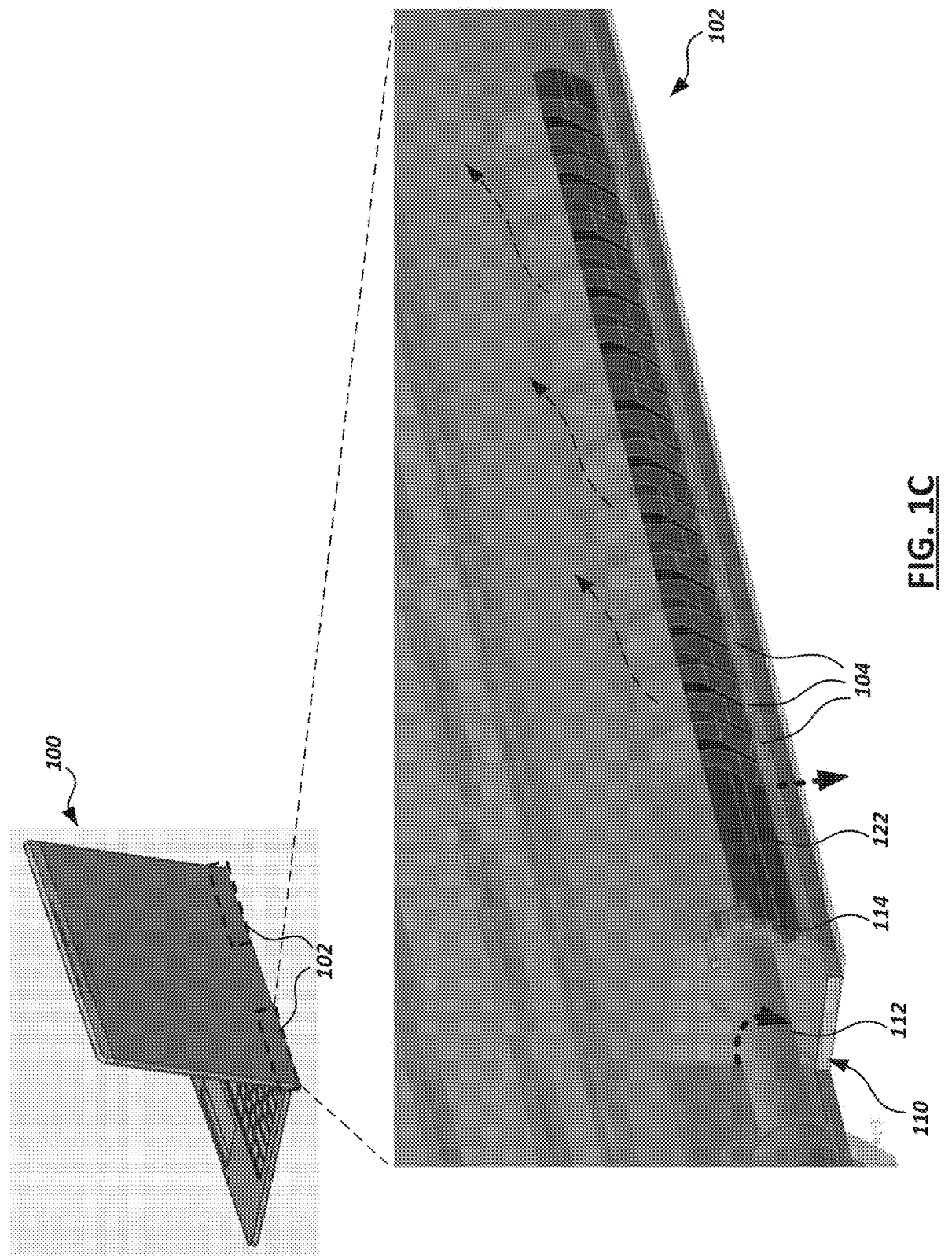
Figure 1D:

FIGS. 1A-1D illustrate an example notebook computer system 100 with a dynamic exhaust port mechanism 102. In particular, FIGS. 1A-1B illustrate the notebook computer system with its lid closed, while FIGS. 1C-1D illustrate the notebook computer system with the lid opened. The example laptop 100 includes a top lid portion that includes a display (e.g., an LCD or other type of display for the computer system 100) and a bottom base portion coupled to the lid at one end via a hinge apparatus 110. The base portion defines a set of exhaust openings 104 that allow hot air to be expelled from within the base (e.g., air heated by a processor of the notebook computer system). The example hinge apparatus 110 includes a shaft portion 112 that is coupled to the lid of the notebook computer such that it rotates when the lid is moved with respect to the base (e.g., opened or closed). The shaft 112 is coupled to a gear 114, which is in turn coupled to a solid panel 122 (via gear teeth on the solid panel in the example shown) that is positioned proximate to the openings 104 such that the solid panel 122 obstructs a portion of the openings 104. The gear 114 and gear teeth of the solid panel 122 may together form a rack and pinion-type gear mechanism.

Because of the coupling described above, when the lid of the notebook computer is closed, the shaft 112 and gear 114 will rotate as shown in FIGS. 1A-1B and the solid panel 122 will move upward as shown to obstruct the upper portion of the openings 104 and direct exhaust flow downward (away from the lid, and thus, the display). Conversely, when the lid is opened, the shaft 112 and gear 114 will rotate as shown in FIGS. 1C-1D and the solid panel 122 will move downward to obstruct the lower portion of the openings 104 to direct exhaust flow upward and away from the display. In some embodiments, the dynamic exhaust port mechanism may be designed such that the solid panel obstructs the top portion of the openings 104 (proximate to the lid when the lid is closed, i.e., positioned approximately parallel with the base as shown in FIG. 1B), and obstructs the bottom portion of the openings 104 when the lid is positioned at an angle greater than 90° with respect to the base (e.g., as shown in FIG. 1D).

Although shown in FIGS. 1A-1D as utilizing a dynamic exhaust port mechanism based on mechanical connections, certain embodiments may utilize circuitry and/or logic to position the solid panel 122 with respect to the openings 104 (e.g., using actuators, motors, field-programmable gate arrays (FPGAs), or other types of circuitry and/or logic). In addition, although the example shown in FIGS. 1A-1D utilizes a solid panel 122 positioned within the base of the notebook computer 100, embodiments may implement the solid panel 122 in another location or manner. Moreover, another type of exhaust port mechanism may be used instead of a solid panel that moves to obstruct different portions of the openings 104. For example, some embodiments may implement an exhaust port apparatus similar to the one described further below that dynamically changes the angle of exhaust port openings (through mechanical coupling as described above, electrical motors, or otherwise) based on the position of the lid with respect to the base. Further, although one dynamic exhaust port mechanism 102 is shown, the notebook computer system 100 may include additional dynamic exhaust port mechanisms (e.g., in the two locations indicated in FIGS. 1A, 1C). In certain embodiments, instead of changing the angle or orientation of the effective exhaust port openings as described above, the dynamic exhaust port mechanism may open/close one opening of multiple openings, or one portion (e.g., a subset of multiple openings) of an overall exhaust port design, such as in the examples shown in FIGS. 2A-2D and described below.

Further, although the examples shown in FIGS. 1A-1D include the dynamic exhaust port mechanism in the base of the notebook computer 100, it will be understood that a dynamic exhaust port mechanism may be included in other portions of the notebook computer 100. For example, in some embodiments, a dynamic exhaust port mechanism as described herein may be include in the lid of the notebook computer 100, e.g., when there is processing circuitry located within the lid portion (either in addition to or in lieu of the processing circuitry in the base).

Figure 2B:
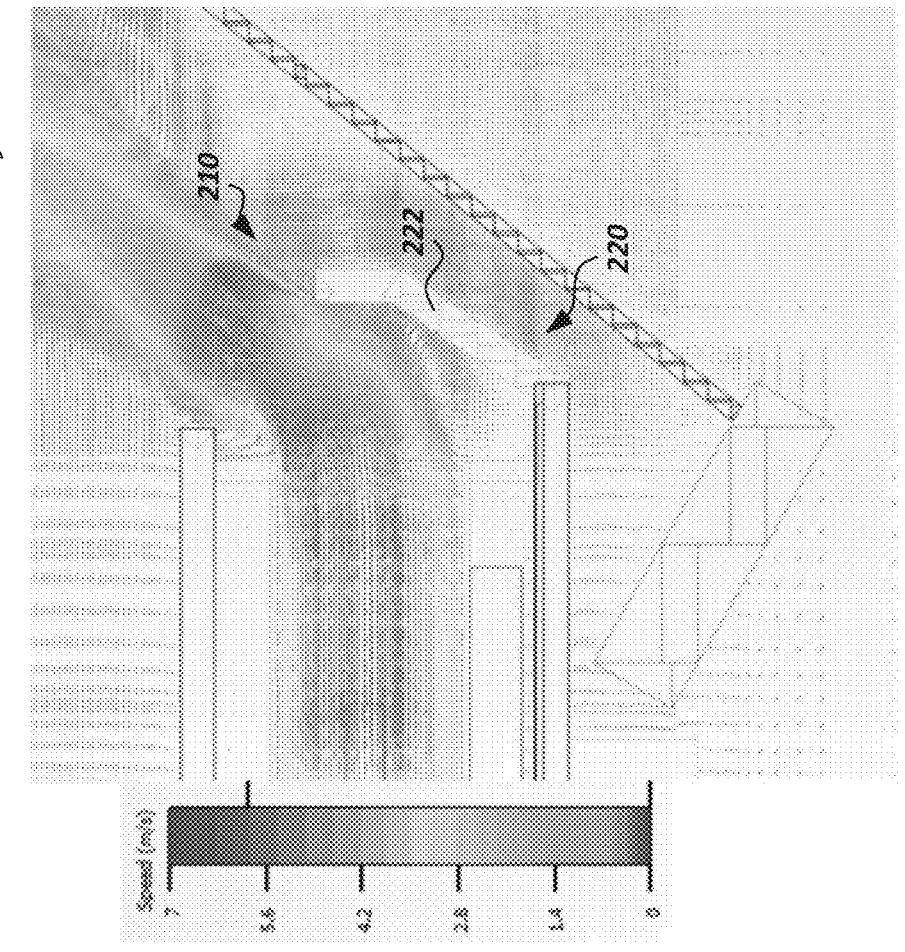
FIGS. 2A-2D illustrate example air flow scenarios for a notebook computer incorporating a dynamic exhaust port mechanism in accordance with embodiments of the present disclosure.
Figure 2A:
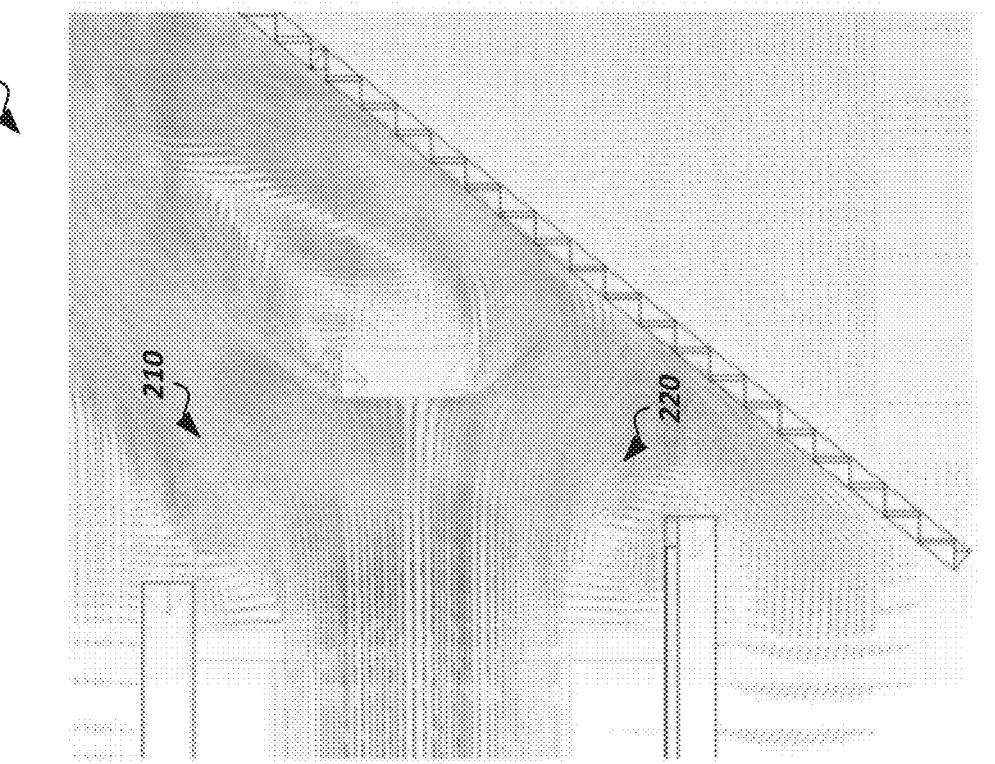
Figures 2C, 2D:
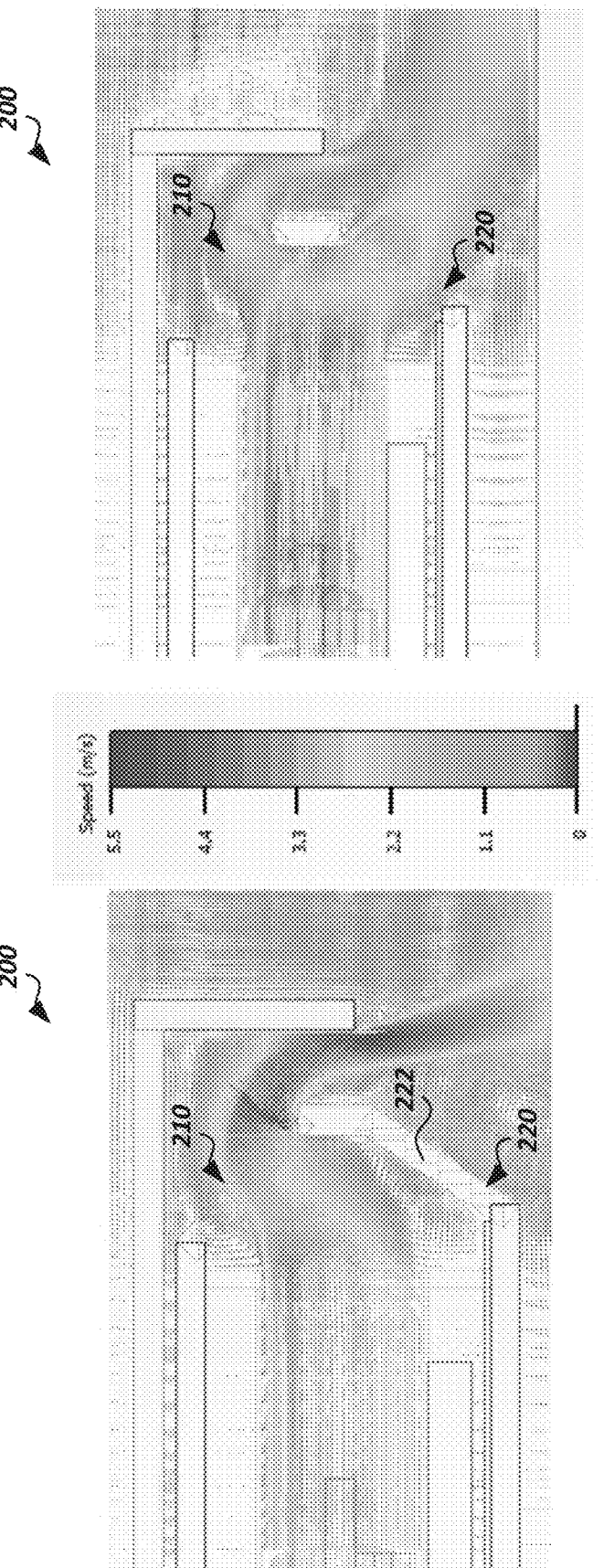

FIGS. 2A-2D illustrate example air flow scenarios for a notebook computer incorporating a dynamic exhaust port mechanism in accordance with embodiments of the present disclosure. In particular, FIGS. 2A-2B illustrate example air flow scenarios for a notebook computer with its lid in an open position (e.g., at an angle greater than 90° with respect to the base), while FIGS. 2C-2D illustrate example air flow scenarios for a notebook computer with its lid closed (e.g., approximately parallel with the base). In the examples shown, the notebook computer 200 includes two exhaust port openings, an upper opening 210 and a lower opening 220.

In the example shown in FIG. 2A, the lower opening 220 is open, allowing hot air to flow against the display surface and potentially causing one or more issues as described above. In the example shown in FIG. 2B, however, the lower opening 220 is closed (e.g., using a solid panel as described above), and the hot air exits through top exhaust opening portion, away from the display, reducing the direct impingement of hot air on the display. This creates a thin air blanket between the display surface and the hot air exiting upper opening 210. In this way, hot air recirculation at the bottom edge of the bottom portion of the base (sometimes referred to as a "D-cover") may be significantly reduced. In some cases, a dynamic exhaust port mechanism that closes the bottom portion as shown in FIG. 2B may reduce the overall exhaust airflow out of the exhaust openings 210, 220 (e.g., by ~5%) when compared with the example shown in FIG. 2A. Despite this lower overall airflow, temperatures (e.g., the overall C&D cover and display temperature) may still drop by ~3-4° C. in the example shown in FIG. 2B when compared with the example shown in FIG. 2A.

Turning to the closed lid scenarios shown in FIGS. 2C-2D, the lower opening 220 is closed in the example shown in FIG. 2C (e.g., using a solid panel as described above) and open in the example shown in FIG. 2D. By opening the lower opening 220 in this scenario, hot air flow is directed downward, away from the lower portion of the display rather than directly at it. This may prevent one or more of the issues described above. Further, smoother overall airflow may be achieved as shown.

Although the lower opening 220 is open/closed as part of the example dynamic exhaust port implementation shown in FIGS. 2A-2D and described above, embodiments of the present disclosure may also open or close the upper opening 210 as part of a dynamic exhaust port mechanism. Moreover, although the examples shown illustrate the lower opening 220 being fully open/closed, the opening(s) may be partially opened/closed in certain embodiments.

Figure 3A:
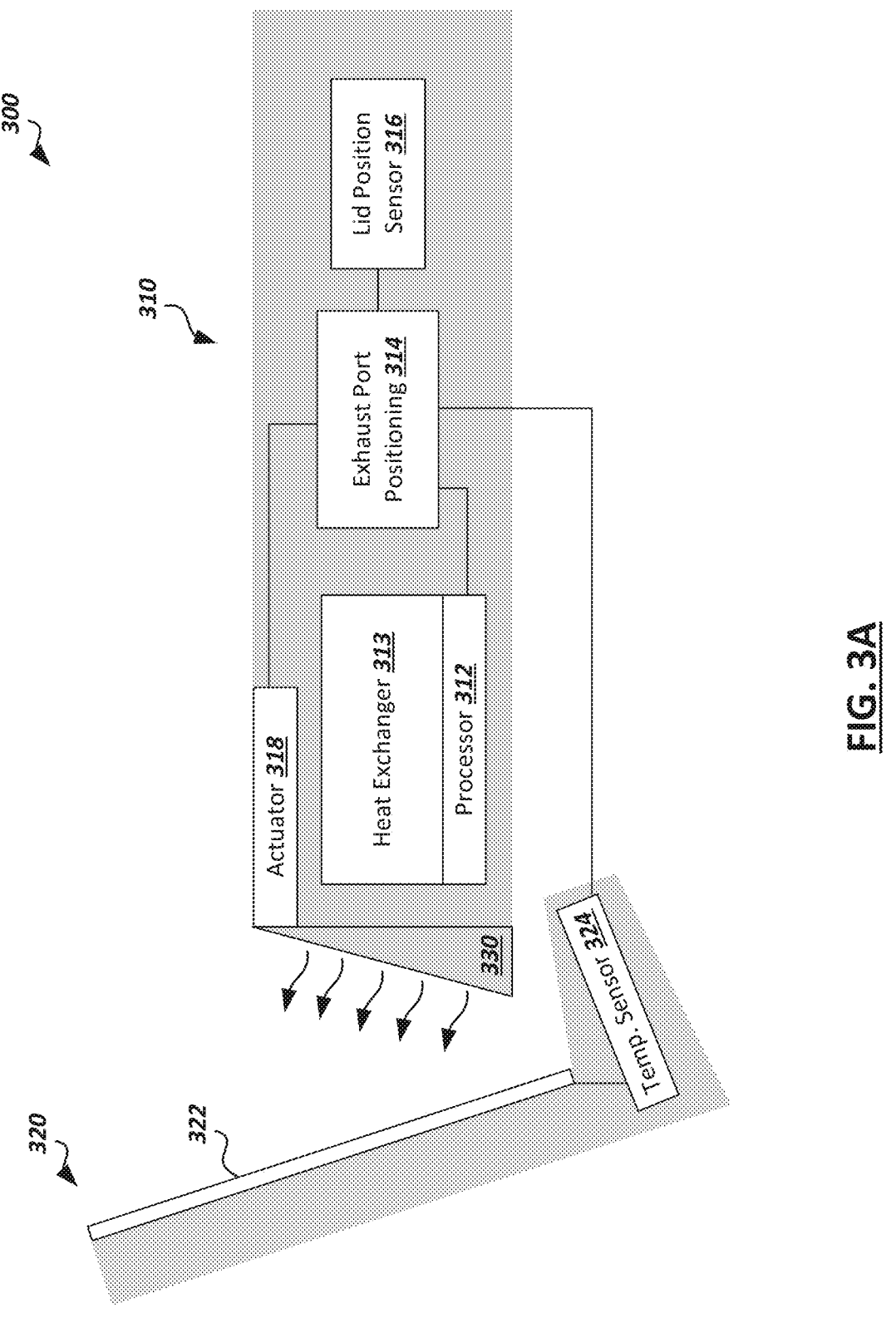
Figure 3B:
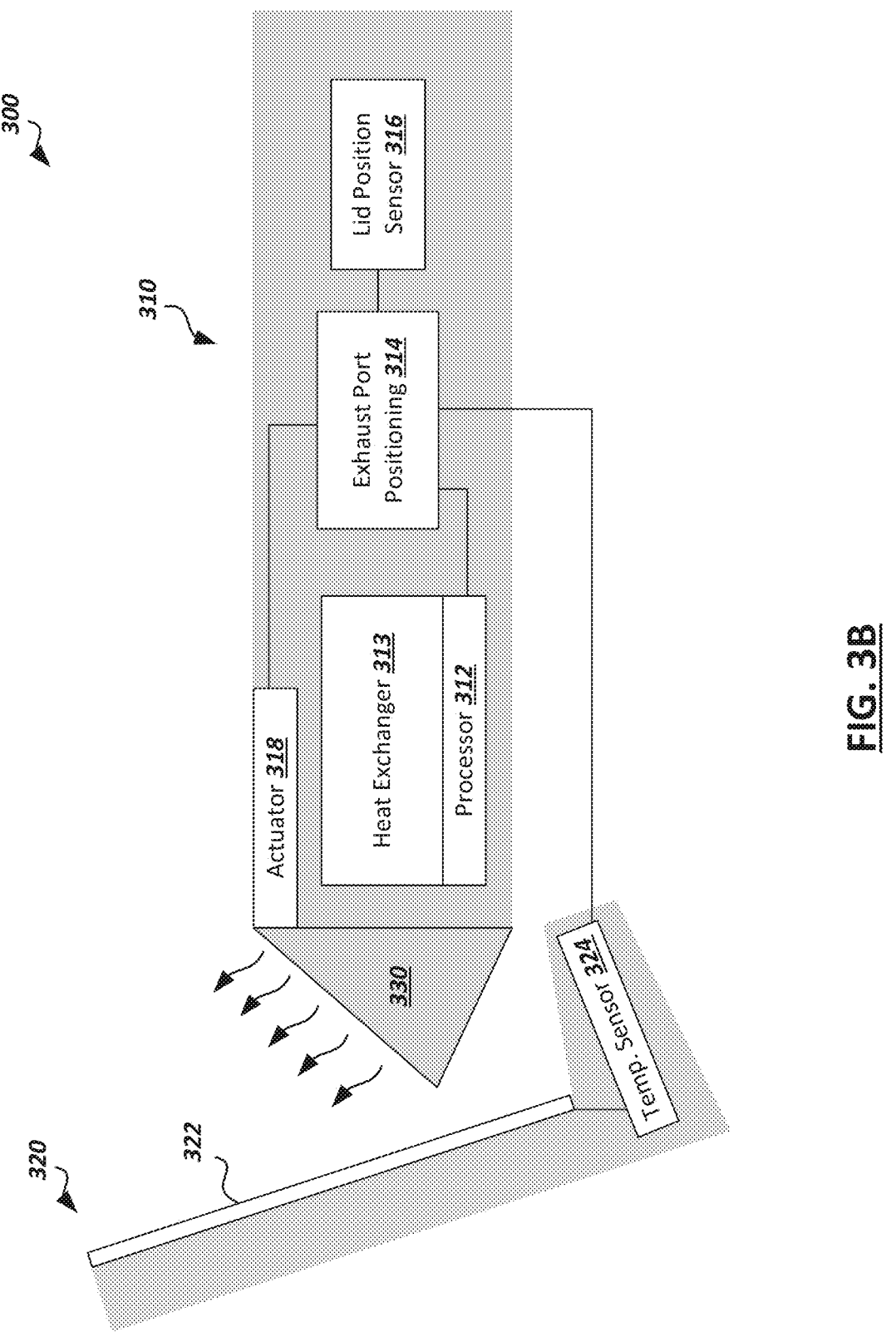

FIGS. 3A-3C illustrate simplified diagrams of an example dynamic exhaust port mechanism implementation in a notebook computer 300. The example notebook computer 300 includes a base portion 310 and a lid portion 320. The base 310 includes a processor 312, a heat exchanger 313 coupled to the processor (which may include a heat sink and/or fan to absorb and dissipate heat generated by the processor), exhaust port positioning circuitry 314, a lid position sensor 316, and an actuator 318. The lid 320 includes a display 322 (e.g., an LCD-based display, OLED display, or other type of display) and a temperature sensor 324 that detects a temperature at the base of the display 322 (e.g., a skin temperature of the display 322). The example notebook computer 300 also includes an exhaust port apparatus 330 coupled to or integrated with the base 310. The exhaust port apparatus 330 defines an opening or set of openings (which may be referred to as exhaust port openings) that allow for air (e.g. hot air generated by the processor 312 and/or heat exchanger 313) to escape from the base 310.

In certain embodiments, components of the notebook computer 300 may be configured to alter the position or orientation of the exhaust port openings of the exhaust port apparatus 330 based on one or more factors, such as a lid angle with respect to the base, a temperature near the lower portion of the display, a workload of the processor 312, other factors, or a combination thereof. For instance, in the examples shown, the orientation of the exhaust port openings of the exhaust port apparatus 330 determined by the exhaust port positioning circuitry 314 based on one or more of: information from the processor 312 about its current workload, readings from the lid position sensor 316, and readings from the temperature sensor 324. The exhaust port positioning circuitry 314 may manipulate the orientation of the exhaust port openings of the exhaust port apparatus 330 using actuator 318. For example, in some embodiments, the exhaust port positioning circuitry 314 may implement the logic of the process 400 of FIG. 4. The exhaust port positioning circuitry 314 may be implemented by any suitable data processing apparatus, including, for example, a microprocessor or programmable logic circuitry (e.g., FPGA). The actuator 318 may include one or more motors that are operated based on signals from the exhaust port positioning circuitry 314, and the motors of the actuator 318 may in turn operate to position or orient the openings of the exhaust port apparatus 330.

In the examples shown in FIGS. 3A-3B, the lid 320 is in an open position (which may be defined by the lid 320 being oriented at an angle with respect to the base 310 that is greater than a particular threshold, e.g., 30°, 60°, or 90°), and in the example shown in FIG. 3C, the lid 320 is in a closed position. Based on one or more of the lid position, temperature near the bottom portion of the display, and current processor workload, the exhaust port apparatus 330 apparatus has been oriented in a different manner by the exhaust port positioning circuitry 314 in each example. That is, the exhaust port positioning circuitry 314 has determined that the orientation of the exhaust port apparatus 330 should be different in each of the scenarios shown in FIGS. 3A-3C.

Referring to the examples shown in FIGS. 3A, 3B, for instance, the lid 320 is in the open position in both scenarios. However, the exhaust port positioning circuitry 314 has selected a different orientation of the exhaust port apparatus 330 for each case, with the exhaust port apparatus 330 being oriented at a lower angle in FIG. 3A as compared with a higher angle in FIG. 3B. This may be due to the processor 312 having a higher workload in the scenario illustrated in FIG. 3B as compared with the scenario illustrated in FIG. 3A, as the orientation shown in FIG. 3B may be more desirable to prevent display issues if the processor 312 is generating more heat and thus, hotter air. Likewise, the higher angle as shown in FIG. 3B as compared with FIG. 3A may be selected by the exhaust port positioning circuitry 314 if the temperature sensor 324 is suddenly reporting a higher temperature near the bottom of the display 322 (e.g., display skin temperature). By comparison, in the scenario shown in FIG. 3C, the exhaust port positioning circuitry 314 has selected a downward facing orientation for the openings of the exhaust port apparatus 330 based on the lid 320 being in the closed position. The selection of the downward facing orientation in the closed lid scenario may be made, in some embodiments, regardless of the temperature from temperature sensor 324 or the workload of the processor 312.

Although FIGS. 3A-3C illustrate a particular embodiment with particular components and positioning of components in the notebook computer 300, other embodiments may include additional, fewer, or different components or arrangements of components. For example, in some embodiments, the exhaust port apparatus 330 may be mechanically linked to the lid 320 (e.g., as described above with respect to FIGS. 1A-1D) such that its position changes as the lid 320 is moved with respect to the base 310 (e.g., opened or closed). As another example, in certain embodiments, the actuator 318 may be configured to directly change the orientation of the exhaust port openings based on sensor information (e.g., from temperature sensor 324 or lid position sensor 316) or other information, without the need for the exhaust port positioning circuitry 314 to first determine an optimal exhaust port opening orientation. Further, some embodiments may incorporate the lid position sensor 316 and/or temperature sensor 324 in different locations than those shown.

Figure 4:
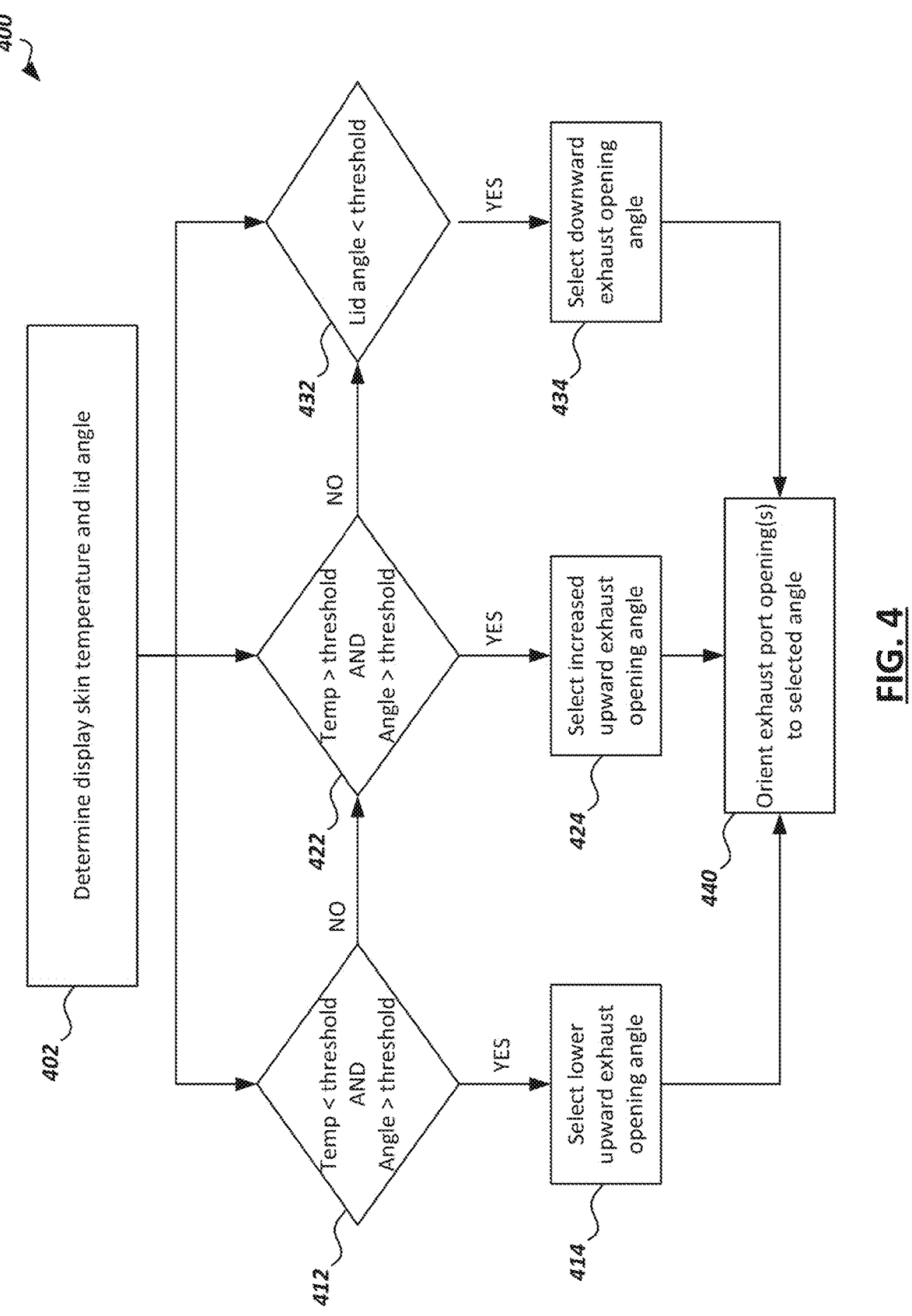
FIG. 4 illustrates a flow diagram of an example process that may be implemented in a dynamic exhaust port mechanism of the present disclosure.

FIG. 4 illustrates a flow diagram of an example process 400 that may be implemented in a dynamic exhaust port mechanism of the present disclosure. The example process may be implemented in software, firmware, hardware, or a combination thereof. For example, in some embodiments, operations in the example process 400 may be performed by exhaust port positioning circuitry in a notebook computer (e.g., the exhaust port positioning circuitry 314 of FIGS. 3A-3C. In some embodiments, a computer-readable medium may be encoded with instructions (e.g., a computer program) that implement one or more of the operations in the example process 400. The example process 400 may include additional or different operations, and the operations may be performed in the order shown or in another order. In some cases, one or more of the operations shown in FIG. 4 are implemented as processes that include multiple operations, sub-processes, or other types of routines. In some cases, operations can be combined, performed in another order, performed in parallel, iterated, or otherwise repeated or performed another manner.

At 402, a display skin temperature and lid angle (e.g., with respect to the base) for a notebook computer are determined. The skin temperature and lid angle detections may be determined based on readings from a temperature sensor (e.g., temperature sensor 324 of FIGS. 3A-3C) and lid position sensor (e.g., lid position sensor 316 of FIGS. 3A-3C), respectively. The information from sensor readings may be sent to logic (e.g., exhaust port positioning circuitry 314) which may use the information to determine an optimal exhaust port orientation, e.g., as follows.

At 412, it is determined whether the temperature is less than a threshold temperature and the lid angle is greater than a threshold lid angle (i.e., considered to be in the open position). If so, then a lower upward exhaust opening angle is selected and the exhaust port openings are oriented to the selected angle at 414 and 440, respectively. The lower upward exhaust opening angle may be, in certain embodiments, between 1° and 40° (e.g., 30°) with respect to the vertical (e.g., as shown in FIG. 5A).

At 422, it is determined whether the temperature is greater than the threshold temperature and the lid angle is greater than the threshold lid angle (i.e., considered to be in the open position). If so, then an increased upward exhaust opening angle is selected and the exhaust port openings are oriented to the selected angle at 424 and 440, respectively. The increased upward exhaust opening angle may be, in certain embodiments, between 41° and 80° (e.g., 50°) above horizontal with respect to the vertical (e.g., as shown in FIG. 5B).

At 412, it is determined whether the lid angle is less than a threshold lid angle (i.e., considered to be in the closed position). If so, then a downward exhaust opening angle is selected and the exhaust port openings are oriented to the selected angle at 434 and 440, respectively. The downward exhaust opening angle may be, in certain embodiments, between 1° and 50° (e.g., 30°) with respect to the vertical, but the exhaust port openings may be oriented in the opposite direction than in 414, 424.

Figure 5B:
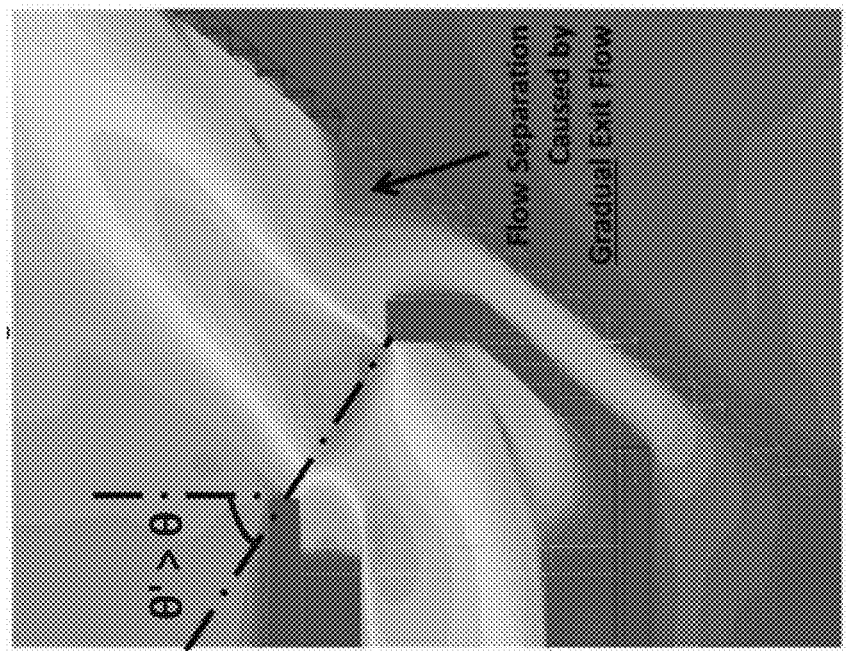
FIGS. 5A-5B illustrate further example air flow scenarios for a notebook computer incorporating a dynamic exhaust port mechanism in accordance with embodiments of the present disclosure.
Figure 5A:
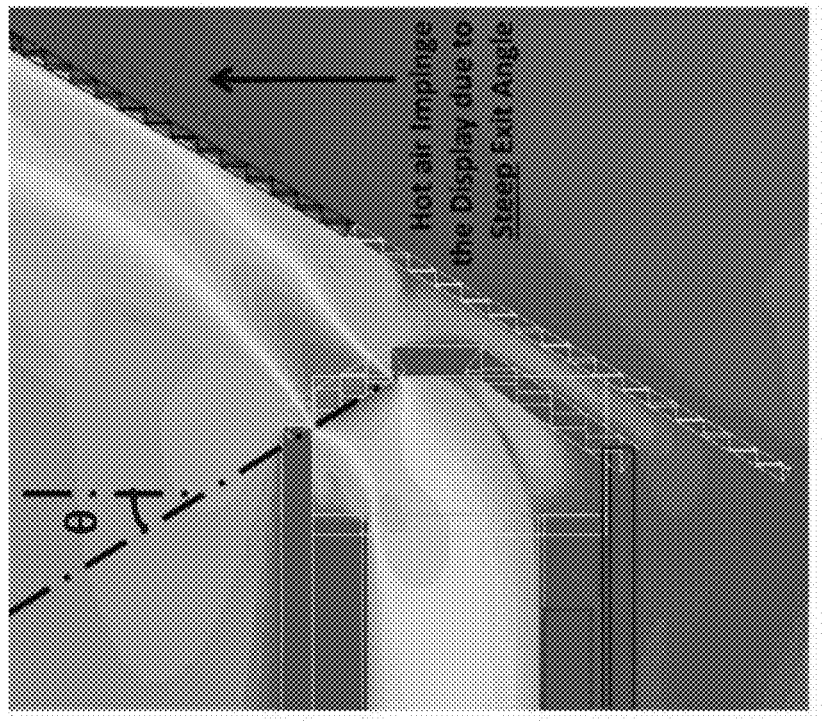

FIGS. 5A-5B illustrate further example air flow scenarios for a notebook computer incorporating a dynamic exhaust port mechanism in accordance with embodiments of the present disclosure. In the example shown in FIG. 5A, the exhaust port opening is oriented at an angle θ, and is causing expelled air to impinge upon the lower part of the display as shown. However, in the example shown in FIG. 5B, the exhaust port opening is oriented at an angle θ'>θ, and is causing a flow separation between expelled air and the display as shown, which may prevent increased display temperatures and associated issues described above.

FIG. 6 is a flow diagram of another example process 600 that may be implemented in a dynamic exhaust port mechanism of the present disclosure. The example process may be implemented in software, firmware, hardware, or a combination thereof. For example, in some embodiments, operations in the example process 600 may be performed by exhaust port positioning circuitry in a notebook computer (e.g., the exhaust port positioning circuitry 314 of FIGS. 3A-3C. In some embodiments, a computer-readable medium may be encoded with instructions (e.g., a computer program) that implement one or more of the operations in the example process 600. The example process 600 may include additional or different operations, and the operations may be performed in the order shown or in another order. In some cases, one or more of the operations shown in FIG. 6 are implemented as processes that include multiple operations, sub-processes, or other types of routines. In some cases, operations can be combined, performed in another order, performed in parallel, iterated, or otherwise repeated or performed another manner.

At 602, an indication of a lid position of a notebook computer system (with respect to the base) is obtained. The indication may be obtained based on a reading from one or more lid position sensors, e.g., lid position sensor 316 of FIGS. 3A-3C. For example, the lid position sensor may sense a relative angle of the lid with respect to the base and report the angle or information indicating the angle to logic circuitry (e.g., the exhaust port positioning circuitry 314 of FIGS. 3A-3C) of the computer system.

At 604, an indication of a temperature near the lid/base coupling is obtained. The indication may be obtained based on a reading from one or more temperature sensors (e.g., temperature sensor 324 of FIGS. 3A-3C) near the lid/base coupling. The temperature sensors may be in the lid or the base of the notebook computer, or a combination thereof. In some embodiments, the temperature sensors may include skin temperature sensors that detect the skin or surface temperature of the display near the lid/base coupling. The temperature sensors may sense the skin temperature and report the temperature or information indicating the temperature to the logic circuitry (e.g., the exhaust port positioning circuitry 314 of FIGS. 3A-3C) of the computer system.

At 606, an indication of a workload for a processor of the notebook computer system is obtained. The indication may be obtained directly from the processor or from software executing on the processor (e.g., an operating system or other program that monitors the processor workload). The processor workload information or information related to the processor workload may be reported to the logic circuitry (e.g., the exhaust port positioning circuitry 314 of FIGS. 3A-3C) of the computer system.

At 608, an optimal exhaust port opening orientation is determined based on the lid position information obtained at 602, temperature information obtained at 604, and/or processor workload information obtained at 606. In some embodiments, this may include selecting one position from a set of predetermined positions for the exhaust port openings. For example, the logic circuitry (e.g., the exhaust port positioning circuitry 314 of FIGS. 3A-3C) that obtained the lid position, temperature, and/or processor workload information may utilize that information (e.g., compare it to one or more thresholds or otherwise process the information) to determine the optimal exhaust port opening orientation. As an example, the logic circuitry may implement one or more operations in the process 400 of FIG. 4.

At 610, the exhaust port openings are oriented based on the selection made at 608. The exhaust port openings may be oriented using one or more actuators, e.g., actuator 318 of FIGS. 3A-3C, based on signals sent from the logic circuitry.

Figure 7A:
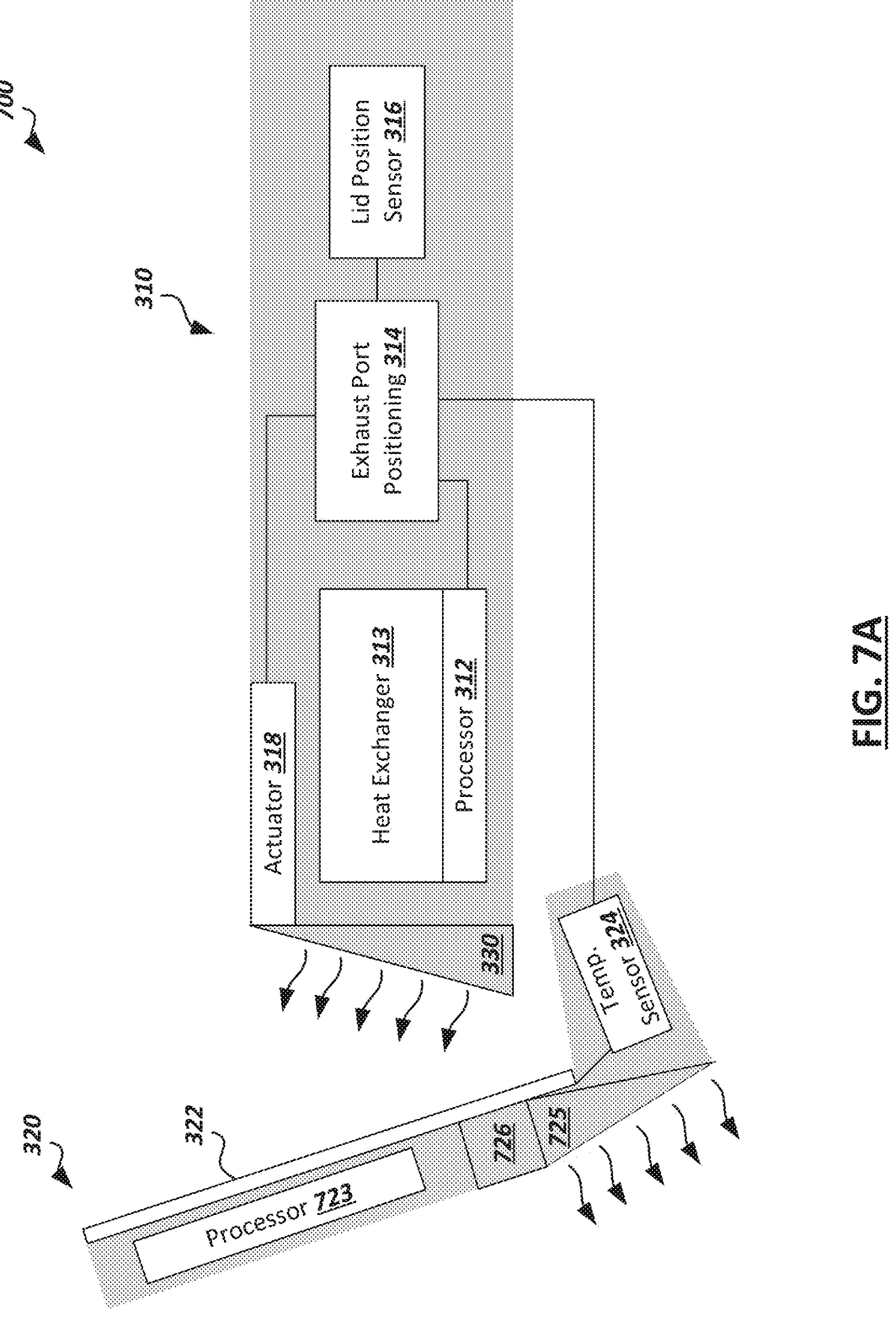
FIGS. 7A-7B illustrate simplified diagrams of an example dynamic exhaust port mechanism implementation in a notebook computer.
Figure 7B:
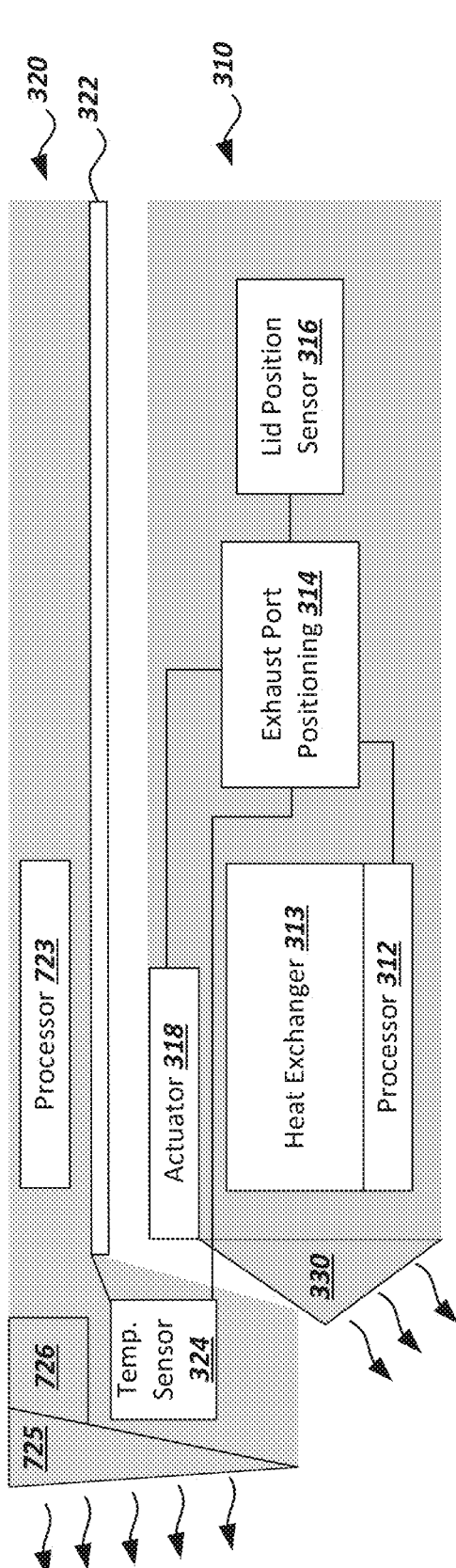

FIGS. 7A-7B illustrate simplified diagrams of another example dynamic exhaust port mechanism implementation in a notebook computer 700. The example notebook computer 700 is configured in the same manner as the notebook computer 300 of FIGS. 3A-3C, except the notebook computer 700 further includes a processor 723 in the lid 320 and an additional exhaust port apparatus 725 in the lid 320. The exhaust port apparatus 725 defines an opening or set of openings (which may be referred to as exhaust port openings) that allow for air (e.g. hot air generated by the processor 723 to escape from the lid 320. In certain embodiments, components of the notebook computer 700 may be configured to alter the position or orientation of the exhaust port openings of the exhaust port apparatus 723 based on one or more factors, such as a lid angle with respect to the base, a temperature near the lower portion of the display, a workload of the processor 723, other factors, or a combination thereof. For instance, in the examples shown, the orientation of the exhaust port openings of the exhaust port apparatus 725 may be determined by the exhaust port positioning circuitry 314 based on one or more of: information from the processor 723 about its current workload, readings from the lid position sensor 316, and readings from the temperature sensor 324. The exhaust port positioning circuitry 314 may manipulate the orientation of the exhaust port openings of the exhaust port apparatus 330 using an actuator 726 that functions similar to actuator 318.

Figure 8:
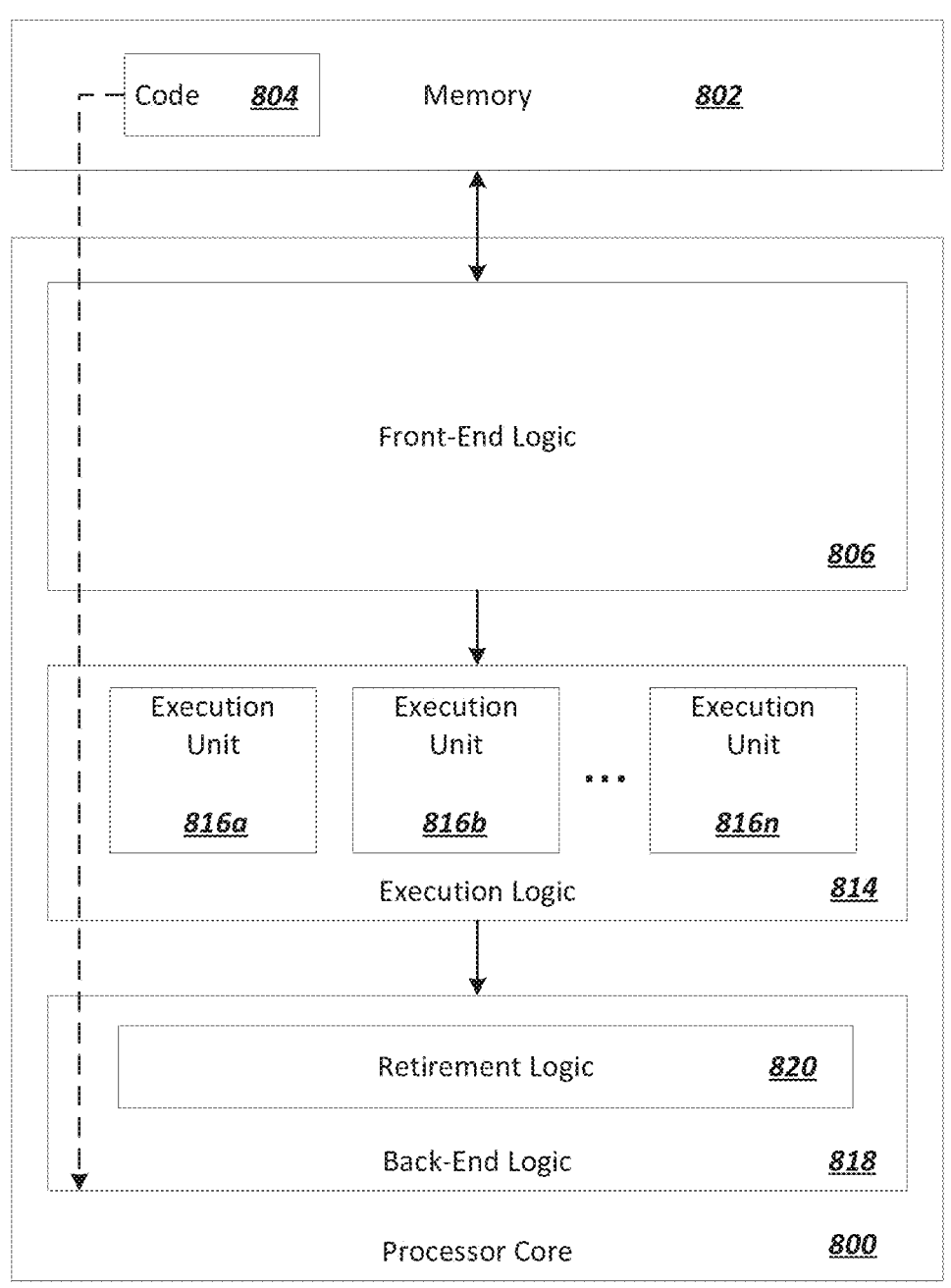
FIG. 8 is an example illustration of a processor according to an embodiment.
Figure 9:
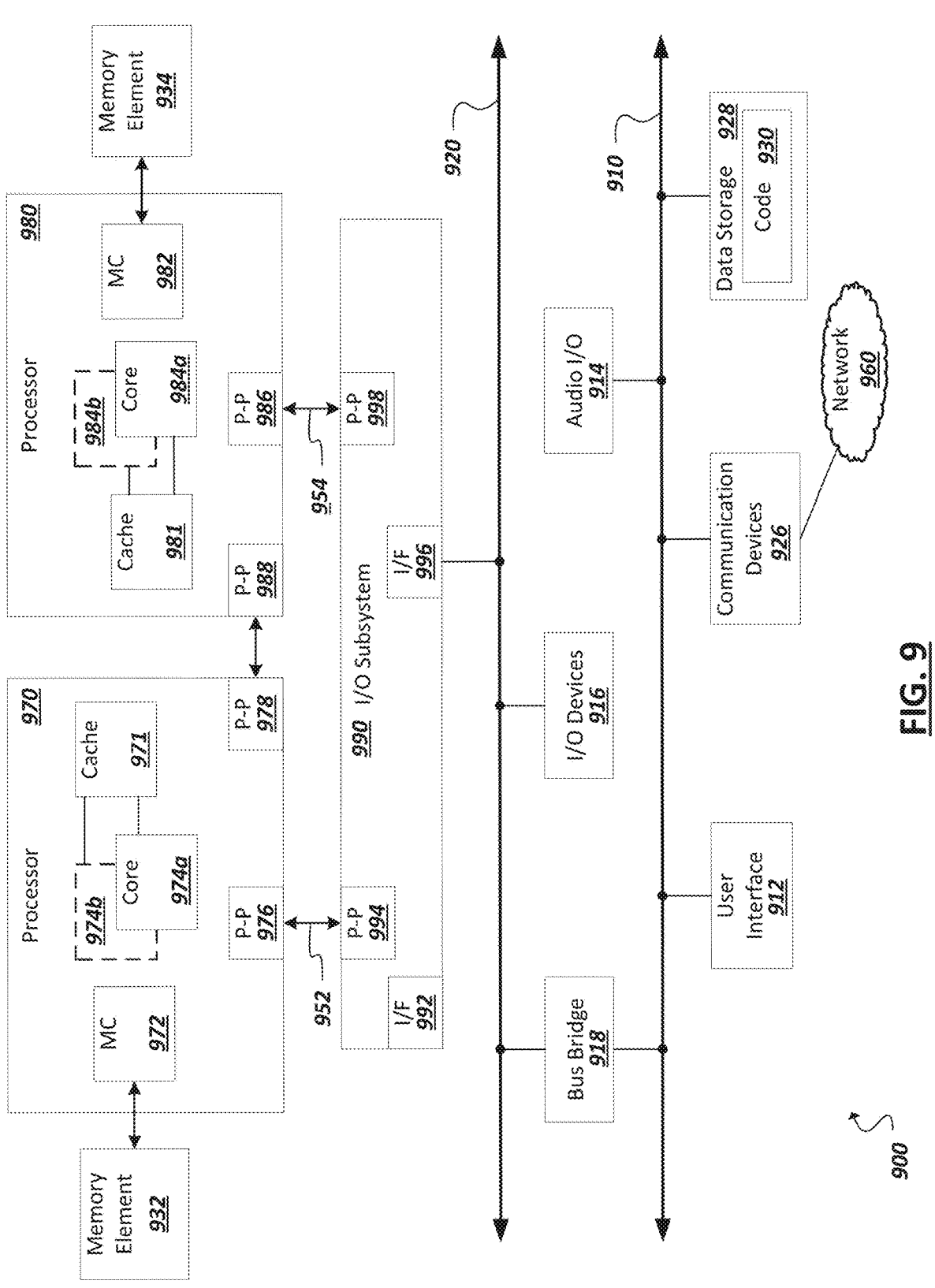
FIG. 9 illustrates a computing system that is arranged in a point-to-point (PtP) configuration according to an embodiment.

FIGS. 8-9 are block diagrams of example computer architectures that may be used in accordance with embodiments disclosed herein. For example, in some embodiments, a computer system (e.g., a notebook computer system) containing one or more aspects shown in FIGS. 8-9 (e.g., the processor 312 of FIGS. 3A-3C may be implemented similar to the core 800 of FIG. 8 or one or both of processors 970, 980 of FIG. 9) may implement a dynamic exhaust port mechanism as described herein. Other computer architecture designs known in the art for processors and computing systems may also be used. Generally, suitable computer architectures for embodiments disclosed herein can include, but are not limited to, configurations illustrated in FIGS. 8-9.

FIG. 8 is an example illustration of a processor according to an embodiment. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816*a*, 816*b*, 816*n*, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 800.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a co-processor 938, such as a high-performance graphics circuit, machine learning accelerator, or other co-processor 938, via an interface 939, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes a system (e.g., computer system) that includes a lid comprising a display; a base coupled to the lid at one end of the base, the base defining one or more openings proximate to the end at which the lid is coupled to the base; and a solid panel positioned proximate to the openings in the base such that the panel partially obstructs the openings of the base, wherein a position of the solid panel with respect to the openings of the base is based on a position of the lid with respect to the base.

Example 2 includes the subject matter of Example 1 and/or other Example(s), and optionally, wherein the base is coupled to the lid via a hinge apparatus, and the solid panel is coupled to the hinge apparatus such that the position of the solid panel with respect to the openings is to change based on movement of the lid with respect to the base.

Example 3 includes the subject matter of Example 2 and/or other Example(s), and optionally, wherein the hinge apparatus comprises a gear to rotate based on movement of the lid with respect to the base, the gear coupled to the solid panel such that the solid panel is to move with respect to the openings when the gear rotates.

Example 4 includes the subject matter of Example 3 and/or other Example(s), and optionally, wherein the solid panel comprises a set of gear teeth to engage the gear of the hinge apparatus.

Example 5 includes the subject matter of Example 1 and/or other Example(s), and optionally, further comprising circuitry to detect a position of the lid with respect to the base and control the position of the solid panel with respect to the openings of the base based on the detected position of the lid.

Example 6 includes the subject matter of Example 1 and/or other Example(s), and optionally, further comprising a processor and circuitry to detect a workload of the processor and control the position of the solid panel with respect to the openings of the base based on the detected workload.

Example 7 includes the subject matter of any one of Examples 1-6 and/or other Example(s), and optionally, wherein the solid panel is to obstruct a top portion of the openings proximate to the lid when the lid is positioned approximately parallel with the base, and the solid panel is to obstruct a bottom portion of the openings when the lid is positioned at an angle greater than 90° with respect to the base.

Example 8 includes the subject matter of any one of Examples 1-7 and/or other Example(s), and optionally, wherein the base further comprises a processor and a heat exchanger coupled to the processor, the heat exchanger positioned proximate to the openings defined by the base.

Example 9 includes the subject matter of any one of Examples 1-8 and/or other Example(s), and optionally, wherein the system is or includes a notebook computer.

Example 10 includes one or more computer-readable media comprising instructions that, when executed by a machine, cause the machine to: obtain an indication of a lid position of a notebook computer with respect to a base of the notebook computer; select a position of one or more exhaust openings of the notebook computer based on the detected lid position; and orient the one or more exhaust openings based on the selected position.

Example 11 includes the subject matter of Example 10 and/or other Example(s), and optionally, wherein the instructions are further to obtain an indication of a temperature proximate to an end of the lid at which the lid is coupled to the base of the notebook computer, and select the position of the one or more exhaust openings based on the temperature indication.

Example 12 includes the subject matter of Example 11 and/or other Example(s), and optionally, wherein the temperature indication is for a skin temperature of a display coupled to the lid of the notebook computer.

Example 13 includes the subject matter of any one of Examples 10-12 and/or other Example(s), and optionally, wherein the instructions are further to obtain an indication of a workload for a processor of the notebook computer, and select the position of the one or more exhaust openings based on the workload.

Example 14 includes the subject matter of any one of Examples 10-13 and/or other Example(s), and optionally, wherein the instructions are to select one position from a set of positions for the one or more exhaust openings.

Example 15 includes a system (e.g., a computer system) that includes a lid comprising a display; a base coupled to the lid at one end of the base; an exhaust port apparatus coupled to the base proximate to the end of the base at which the lid is coupled, the exhaust port apparatus defining one or more openings; a lid position sensor to detect a position of the lid relative to the base; and circuitry to orient the exhaust port openings based on information received from the lid position sensor.

Example 16 includes the subject matter of Example 15 and/or other Example(s), and optionally, wherein the circuitry comprises an actuator and logic circuitry to: determine an orientation of the exhaust port openings based on the information received from the lid position sensor; and cause the actuator to orient the exhaust port openings in the determined orientation.

Example 17 includes the subject matter of Example 15 or 16 and/or other Example(s), and optionally, further comprising a temperature sensor to detect a temperature proximate to the end of the base at which the lid is coupled, wherein the circuitry is to orient the exhaust port openings further based on information received from the temperature sensor.

Example 18 includes the subject matter of Example 17 and/or other Example(s), and optionally, wherein the temperature sensor is to measure a temperature of the display at the end of the lid at which the lid is coupled to the base.

Example 19 includes the subject matter of any one of Examples 15-18 and/or other Example(s), and optionally, further comprising a processor, wherein the circuitry is to orient the exhaust port openings further based on a workload of the processor.

Example 20 includes the subject matter of any one of Examples 15-19 and/or other Example(s), and optionally, wherein the circuitry is to select one position from a set of positions for the openings in the exhaust port apparatus.

Example 21 includes the subject matter of any one of Examples 15-20 and/or other Example(s), and optionally, wherein the base further comprises a processor and a heat exchanger coupled to the processor, the heat exchanger positioned proximate to the openings defined by the base.

Example 22 includes the subject matter of any one of Examples 15-21 and/or other Example(s), and optionally, wherein the system is a notebook computer.

Example 23 includes an apparatus or system comprising a lid portion; a base portion coupled to the lid and comprising one or more exhaust openings; and means for orienting the one or more exhaust openings based on a position of the lid with respect to the base.

Example 24 includes the subject matter of Example 23 and/or other Example(s), and optionally, wherein said means comprises a solid panel to obscure a portion of the exhaust openings.

Example 25 includes the subject matter of any one of Examples 23-24 and/or other Example(s), and optionally, wherein said means comprises an actuator to orient the one or more exhaust openings.

Example 26 includes the subject matter of any one of Examples 23-25 and/or other Example(s), and optionally, wherein said means comprises circuitry to: determine an orientation of the exhaust openings based on the position of the lid with respect to the base; and cause said means to orient the exhaust openings based on the determined orientation.

Example 27 includes the subject matter of any one of Examples 23-26 and/or other Example(s), and optionally, further comprising a lid position sensor to detect the position of the lid with respect to the base, wherein said means are to orient the exhaust openings based on information received from the lid position sensor.

Example 28 includes the subject matter of any one of Examples 23-27 and/or other Example(s), and optionally, further comprising a temperature sensor to detect a temperature proximate to an end of the base at which the lid is coupled, wherein said means are to orient the exhaust openings based on information received from the temperature sensor.

Example 29 includes the subject matter of any one of Examples 23-24 and/or other Example(s), and optionally, wherein said means are to orient the exhaust openings based on workload information for a processor of the notebook computer.

Example 30 includes the subject matter of any one of Examples 23-24 and/or other Example(s), and optionally, wherein said means comprises a mechanical coupling between the lid and the means for orienting the one or more exhaust openings.

Example 31 includes the subject matter of any one of Examples 23-30 and/or other Example(s), and optionally, wherein the system comprises a notebook computer.

Example 32 includes an apparatus comprising means for orienting exhaust port openings of a notebook computer based on a position of a lid of the notebook computer with respect to a base of the notebook computer.

Example 33 includes the subject matter of Example 32 and/or other Example(s), and optionally, wherein said means comprises a solid panel to obscure a portion of the exhaust openings.

Example 34 includes the subject matter of any one of Examples 32-33 and/or other Example(s), and optionally, wherein said means comprises an actuator to orient the one or more exhaust openings.

Example 35 includes the subject matter of any one of Examples 32-34 and/or other Example(s), and optionally, wherein said means comprises circuitry to: determine an orientation of the exhaust openings based on the position of the lid with respect to the base; and cause said means to orient the exhaust openings based on the determined orientation.

Example 36 includes the subject matter of any one of Examples 32-35 and/or other Example(s), and optionally, wherein said means are to orient the exhaust openings based on information received from a lid position sensor of the notebook computer.

Example 37 includes the subject matter of any one of Examples 32-36 and/or other Example(s), and optionally, wherein said means are to orient the exhaust openings based on information received from a temperature sensor of the notebook computer.

Example 38 includes the subject matter of any one of Examples 32-37 and/or other Example(s), and optionally, wherein said means are to orient the exhaust openings based on workload information for a processor of the notebook computer.

Example 39 includes the subject matter of any one of Examples 32-33 and/or other Example(s), and optionally, wherein said means comprises a mechanical coupling between the lid and the means for orienting the one or more exhaust openings.

Example 40 includes an apparatus for implementing any method as disclosed herein.

Example 41 includes one or more computer-readable media comprising instructions that, when executed by a machine, cause the machine to implement any method as disclosed herein.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer system comprising:
a lid comprising a display;

a base coupled to the lid at one end of the base via a hinge apparatus, the base defining one or more openings proximate to the end at which the lid is coupled to the base; and a solid panel positioned proximate to the openings in the base such that the panel partially obstructs the openings of the base, the solid panel comprising a first side facing inside the base and defining gear teeth coupled to a gear of the hinge apparatus and a second side opposite the first side and facing the openings, wherein the solid panel is configured to rotate coaxially with the gear of the hinge apparatus based on movement of the lid with respect to the base.

2. The computer system of claim 1, wherein the solid panel is to obstruct a top portion of the openings proximate to the lid when the lid is positioned approximately parallel with the base, and the solid panel is to obstruct a bottom portion of the openings when the lid is positioned at an angle greater than 90° with respect to the base.

3. The computer system of claim 1, wherein the base further comprises a processor and a heat exchanger coupled to the processor, the heat exchanger positioned proximate to the openings defined by the base.

4. The computer system of claim 1, wherein the computer system is a notebook computer.

5. The computer system of claim 1, wherein the gear teeth of the solid panel and the gear of the hinge apparatus together form a rack and pinion-type gear mechanism.

* * * * *